(12) United States Patent
Yang et al.

(10) Patent No.: US 9,722,654 B2
(45) Date of Patent: Aug. 1, 2017

(54) SMART ULTRA BOX AND PROTECTIVE CASE WITH THE SAME

(71) Applicant: MOBILECONN TECHNOLOGY CO., LTD, New Taipei (TW)

(72) Inventors: Chung-Kai Yang, New Taipei (TW); Chin-Tien Lin, Taipei (TW)

(73) Assignee: MOBILECONN TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/041,134

(22) Filed: Feb. 11, 2016

(65) Prior Publication Data

US 2017/0005683 A1 Jan. 5, 2017

(30) Foreign Application Priority Data

Jul. 3, 2015 (TW) .............................. 104210777 U

(51) Int. Cl.
*H04B 1/3883* (2015.01)
*H04M 1/18* (2006.01)
*H04M 1/725* (2006.01)
*H04B 1/3888* (2015.01)

(52) U.S. Cl.
CPC ......... *H04B 1/3888* (2013.01); *H04B 1/3883* (2013.01); *H04M 1/185* (2013.01); *H04M 1/72527* (2013.01)

(58) Field of Classification Search
CPC ... H04B 1/3888; H04B 1/3883; H02J 7/0044; H02J 7/0004; H02J 7/025; H02J 2007/0062; H02J 2007/0096; H02J 7/0027; H02J 7/0052; H02J 7/0054; H02J 17/00; H02J 7/00; G06F 1/1628; G06F 1/1656; G06F 1/1635; G06F 1/1632; H04M 1/0274; H04M 1/72575; H04M 1/185; H01F 38/14; H01M 10/44; G21Y 2004/303

See application file for complete search history.

(56) References Cited

U.S. PATENT DOCUMENTS

| | | | |
|---|---|---|---|
| 6,525,932 B1* | 2/2003 | Ohnishi | G06F 1/1607 235/430 |
| 7,028,126 B1* | 4/2006 | Liang | G06F 13/4068 710/301 |
| 8,690,600 B1* | 4/2014 | Zeolla | H01R 13/72 439/131 |
| 9,077,346 B2* | 7/2015 | Asamura | H01L 23/49541 |

(Continued)

FOREIGN PATENT DOCUMENTS

| JP | 2007244165 | * | 9/2007 |
|---|---|---|---|
| KR | 101423438 | * | 7/2014 |

(Continued)

*Primary Examiner* — Sujatha Sharma
(74) *Attorney, Agent, or Firm* — Li & Cai Intellectual Property (USA) Office

(57) ABSTRACT

A smart ultra box adapting to a protective case is disclosed. The protective case protects a mobile communication device. The ultra box comprises a main body, a conversion unit and an expansion module. The main body has an output interface and an external power interface. The conversion unit disposes at the main body, to electrically connect the output interface and the external power interface. The expansion module electrically connects to the conversion unit. The expansion module is for communication with an external device.

11 Claims, 5 Drawing Sheets

(56) References Cited

U.S. PATENT DOCUMENTS

| | | | | |
|---|---|---|---|---|
| 2004/0202858 A1* | 10/2004 | Lee | ................... | H05K 5/0086 |
| | | | | 428/332 |
| 2012/0178399 A1* | 7/2012 | Yang | ................... | H04M 1/04 |
| | | | | 455/337 |
| 2012/0178505 A1* | 7/2012 | Yang | ................... | G06F 1/263 |
| | | | | 455/573 |
| 2012/0329532 A1* | 12/2012 | Ko | ................... | H04B 1/3888 |
| | | | | 455/573 |
| 2013/0069431 A1* | 3/2013 | Tseng | ................... | H02J 7/0044 |
| | | | | 307/43 |
| 2013/0206844 A1* | 8/2013 | Chen | ................... | H04B 1/3888 |
| | | | | 235/492 |
| 2015/0180527 A1* | 6/2015 | Fathollahi | ................ | H04B 1/3888 |
| | | | | 455/575.8 |
| 2015/0194833 A1* | 7/2015 | Fathollahi | ................ | H02J 7/0044 |
| | | | | 320/114 |
| 2015/0263777 A1* | 9/2015 | Fraden | ................ | H04B 1/3888 |
| | | | | 455/575.8 |
| 2016/0134142 A1* | 5/2016 | Murphy | ................ | H02J 7/0054 |
| | | | | 455/573 |
| 2016/0181860 A1* | 6/2016 | Partovi | ................ | H01F 5/003 |
| | | | | 320/108 |
| 2016/0294427 A1* | 10/2016 | Wojcik | ................ | H04B 1/3883 |

FOREIGN PATENT DOCUMENTS

| | | | |
|---|---|---|---|
| KR | 20150048685 | * | 5/2015 |
| ZA | WO2015022675 | * | 2/2015 |

* cited by examiner

SMART ULTRA BOX AND PROTECTIVE CASE WITH THE SAME

BACKGROUND

1. Technical Field

The present disclosure is related to a smart ultra box and protective case with the same. Especially, this present disclosure is suitable for a mobile communication device.

2. Description of Related Art

In today's market, a power bank usually includes a storage battery and control circuit board in a main body of the power bank, and configures at least a USB transmission interface on the main body. When charging, power stored in the storage battery can be converted by the control circuit board into the appropriate voltage and current. Then, the appropriate voltage and current are provided to a user's mobile device via the USB transmission interface. With the high market growth of smart phones, tablet computers and other mobile devices, and mobile devices developing toward big screen and multi-core, power consumption has increased significantly. In recent years, power bank demand has greatly grown to keep up with the development of simulated actions of the mobile devices.

However, whether smart phones or tablet computers, these operations typically require additional power supply transmission lines to transmit power; moreover, when the power of the battery has run down, this kind of power bank needs a power transformer charger to recharge. That is, users need to carry the power bank, the power supply transmission lines and the power transformer when going out, which is quite troublesome and inconvenient.

SUMMARY

The instant disclosure provides a smart ultra box and protective case with the same, which is used for communication with an external device through the expansion module.

The instant disclosure provides a smart ultra box, adapted to a protective case which is for protecting a mobile communication device. The smart ultra box includes a main body, a conversion unit and an expansion module. The main body includes an output interface and an external power interface. The conversion unit disposes on the main body, to electrically connect the output interface and the external power interface. The expansion unit electrically connects to the conversion unit. The expansion unit is used to communicate with an external device.

The instant disclosure provides a protective case, adapted to accommodate a mobile communication device. The protective case includes an accommodating portion and a smart ultra box. The accommodating portion houses the mobile communication device. The smart ultra box disposes on an outer side of the accommodating portion.

To sum up, the exemplary embodiments of the present disclosure provide a smart ultra box and a protective case thereof, for communication with an external device through the expansion module. Wherein, the protective case is for housing the mobile communication device, which can be a smart phone, to make the mobile communication device get the best protection effect. The present disclosure really enhances the ease of operation, efficiency and quality of the smart ultra box and its protective case.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
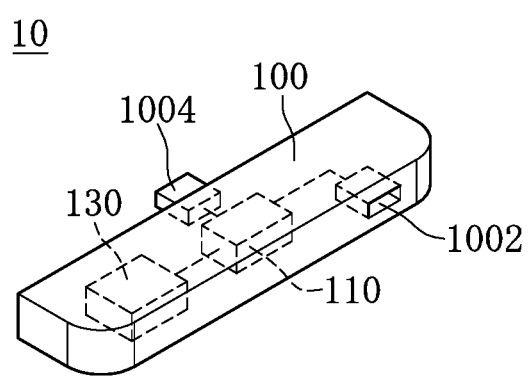
FIG. 1 is a schematic diagram of a smart ultra box according to an exemplary embodiment of the instant disclosure.

Example embodiments will be described below in more detail with reference to the accompanying drawings. Many different forms and embodiments are possible without deviating from the spirit and teachings of this disclosure and so the disclosure should not be construed as limited to the embodiments set forth herein. Rather, these embodiments are provided so that this disclosure will be thorough and complete, and will fully convey the scope of the disclosure to those skilled in the art. In the drawings, the sizes and relative sizes of layers and regions may be exaggerated for clarity. Like reference numbers refer to like elements throughout.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below and hence, a first element, component, region, layer or section may be termed as a second element, component, region, layer or section without departing from the teachings of the present disclosure. As used herein, the term "and/or" includes any and all combinations of one or more of the associated listed items.

The following is to describe a smart ultra box and protective case thereof via a plurality of embodiments with corresponding drawings. However, the embodiments below are not for restricting the scope of the instant disclosure.

Please refer to FIG. 1, which is a schematic diagram of a smart ultra box according to an exemplary embodiment of the instant disclosure. The smart ultra box 10 is adapted to a protective case. The protective case is for protecting a mobile communication device. The smart ultra box 10 includes a main body 100, a conversion unit 110 and an expansion module 130. The protective case is such as a mobile phone protective case, a tablet computer protective case or other communication device protective case. For convenience of explanation, the present disclosure uses a mobile phone protective case to illustrate, but the present disclosure does not limit the protective case.

The conversion unit 110 and the expansion module 130 dispose on the main body 100. The expansion module 130 electrically connects to the conversion unit 110. The smart ultra box 10 which is an ultra box electrically connects between a mobile communication device and an external power source. The smart ultra box 10 can also electrically connect to a mobile communication device. Wherein, the smart ultra box 10 is a platform used as an external power supply to the mobile communication device, or a platform used as communicate to an external device. The above disclosure is not intended to limit the smart ultra box 10 of the present invention.

Moreover, the smart ultra box 10 communicates with an external device via the expansion module 130. And the external device is a sport bracelet, a wearable device, a laptop computer, a sphygmomanometer, a glucose meter (or glucometer), a treadmill, a smart refrigerator, an intelligent appliance, or other devices. The above disclosure is not intended to limit the external device of the present invention. The smart ultra box 10 obtains physiological information, work information and operating information recorded by the external device via the expansion module 130. The expansion module 130 transmits the above physiological information, work information and operating information to a smart phone, or through the expansion module 130 the above physiological information, work information and operating information is recorded in a built-in memory. The above disclosure is not intended to limit the smart ultra box 10 of the present invention.

The expansion module 130 is used to transmit information from at least a wearable device to the smart phone. The expansion module 130 is used to communicate through a Wi-Fi communication device, a Bluetooth communication device or other communication devices. Wherein, the expansion module 130 communicates with the wearable device and the smart phone, and downloads personal information stored in the wearable device to the smart phone. That is, the expansion module 130 is such as a communication bridge connecting between the wearable device and the smart phone. The above disclosure is not intended to limit the expansion module 130 of the present invention.

The expansion module 130 implements through a subscriber identity module (commonly known as a SIM card) or a control chip that serves as an extension of hardware, software or other accessories. For example, the expansion module 130 installs a smart accessory control module to communicate with the software. Thus, the smart ultra box 10 can be used in smart appliances, health management, wireless charging and security systems.

Furthermore, the main body 100 includes an output interface 1004 and an external power interface 1002. The output interface 1004 electrically connects a smart phone, and the external power interface 1002 electrically connects an external power source. The output interface 1004 is such as a power connection port, a data connection port, a universal serial bus connection port (USB port) or a THUNDERBOLT™, that can be used to electrically connect a charging opening, a charging structure, a connecting opening or a connecting structure of the smart phone.

The external power interface 1002 connects a power connection opening to receive a commercial power source from the external power source. That is, the commercial power source enters to the conversion unit 110 via the external power interface 1002. After the conversion unit 110 converts the commercial power source, the main body 100 outputs power to the smart phone via the output interface 1004.

The conversion unit 110 disposes on the main body 100, to electrically connect the output interface 1004 and the external power interface 1002. Substantively, the conversion unit 110 implements through an alternating current (AC) to direct current (DC) converting circuit, a direct current (DC) to direct current (DC) converting circuit and/or a combination of one or more thereof. In the other embodiments, the conversion unit 110 includes a battery, to store and supply electricity to the expansion module 130. But, in another embodiment, the conversion unit 110 does not include a battery. The conversion unit 110 supplies electricity to the expansion module 130, which is transmitted by a power bank PB, or converted by the external power source. The above disclosure is not intended to limit the conversion unit 110 of the present invention.

Figure 2:
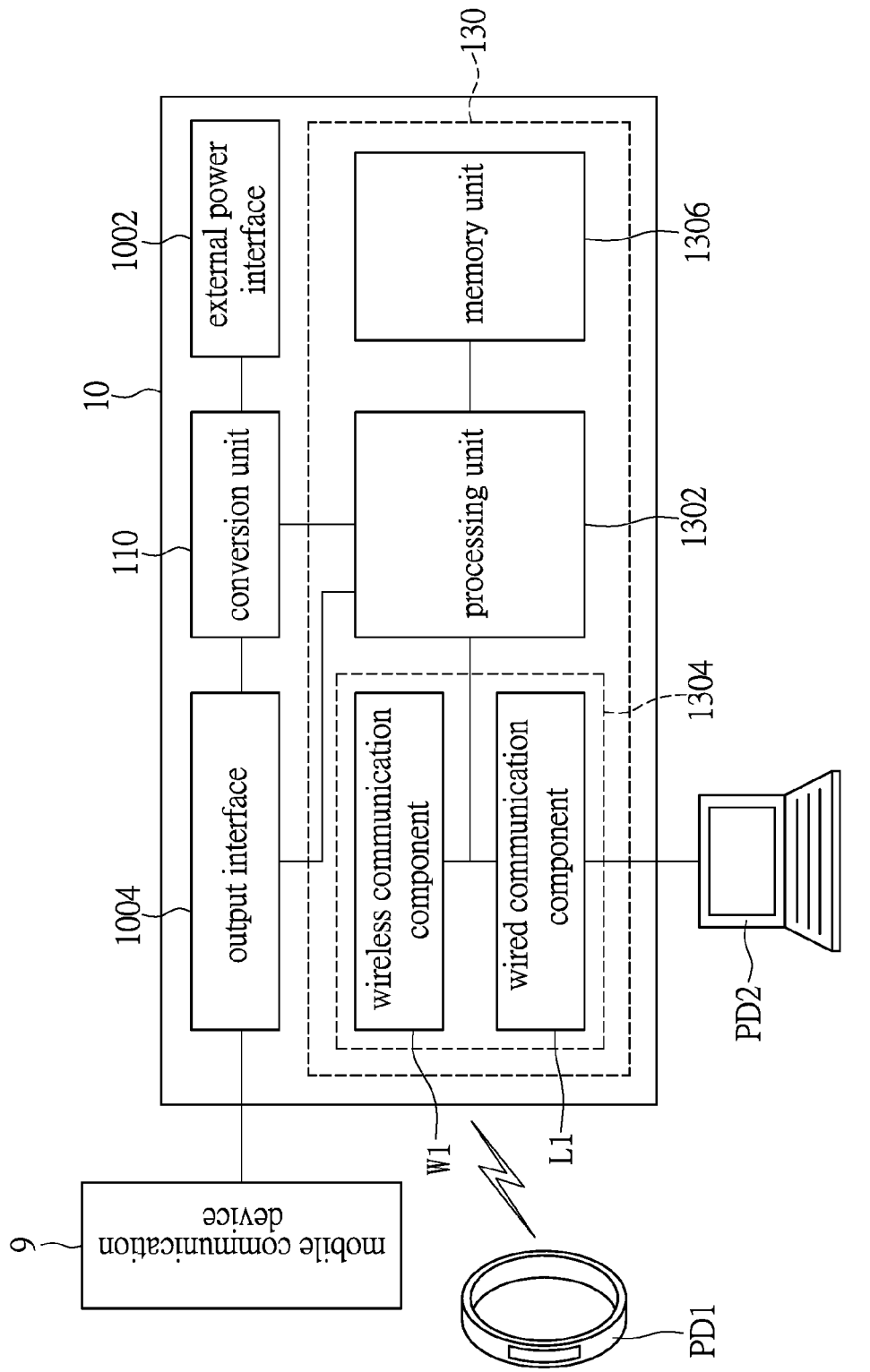
FIG. 2 is a functional block schematic diagram of a smart ultra box according to FIG. 1 provided in accordance with the exemplary embodiment of the present disclosure.

FIG. 2 is a functional block schematic diagram of smart ultra box according to FIG. 1 provided in accordance with the exemplary embodiment of the present disclosure. As shown as FIG. 2, the expansion module 130 includes a processing unit 1302, a memory unit 1306 and a communication unit 1304. The processing unit 1302 electrically connects to the conversion unit 110, the output interface 1004, the memory unit 1306 and the communication unit 1304. The conversion unit 110 is for supplying power to the processing unit 1302, the communication unit 1304 and the memory unit 1306. The communication unit 1304 is used for communication with the external devices PD1-PD2. The processing unit 1302 processes signals between each of the units, and transmits the signals to the mobile communication device 9, or receives the signals from the mobile communication device 9. The above disclosure is not intended to limit the expansion module 130 of the present invention.

In detail, the processing unit 1302 implements through circuits of semiconductor electronic components, such as a control circuit, a processing circuit or an analyzing circuit. The above disclosure is not intended to limit the processing unit 1302 of the present invention. The memory unit 1306 is a secure digital memory card (SD Card), a flash memory and/or a combination of one or more thereof. Wherein, the SD card or the flash memory is a removable component, a pluggable component or a built-in-fixed component. On the other hand, the memory unit 1306 can be such as an extended memory of the smart phone. Thus, the memory unit 1306 increases extra memory capacitance of the smart phone. The above disclosure is not intended to limit the memory unit 1306 of the present invention.

The communication unit 1304 is a wireless communication component W1, a wired communication component L1 and/or a combination of one or more thereof. The wireless communication component W1 implements through a Wi-Fi communication device, a Bluetooth communication device, a radiofrequency communication device or other communication devices. The wired communication component L1 implements through a universal serial bus connection port (USB port) or other connection port. Thus, the expansion module 130 wirelessly connects the external device PD1 via the wireless communication component W1, or by wire connects the external device PD2 via the wired communication component L1. The above disclosure is not intended to limit the communication unit 1304 of the present invention.

For convenience of explanation, the present disclosure uses a sport bracelet as the external device PD1 and a laptop as the external device PD2 to illustrate. Substantively, users record their amount of exercise and sleep quality via the sport bracelet and sync with the memory unit 1306 via the wireless communication component W1 to wirelessly transmit fitness and sleep records of the sports bracelet. Then, the memory unit 1306 stores the fitness and sleep records. And the fitness and sleep records also transmit to the mobile communication device 9. Users can get the fitness and sleep records from the memory unit 1306 of the expansion module 130 via the mobile communication device 9.

Users via the laptop PD2 can write notes and sync with the memory unit 1306 via the wired communication component L1 for wired transmission of the notes of the laptop PD2. In another embodiment, the sport bracelet PD1 via the memory unit 1306 can directly transmit the fitness and sleep records to the mobile communication device 9. The laptop PD2 can via the communication unit 1304 directly transmit the agendas to the communication device 9. Data of the fitness and sleep records and the notes do not need to be stored in the memory unit 1306 of the expansion module 130. The above disclosure is not intended to limit the smart ultra box 10 of the present invention.

In the following description is further instruction in teaching operations and circuit architecture of the protective case.

Figure 3:
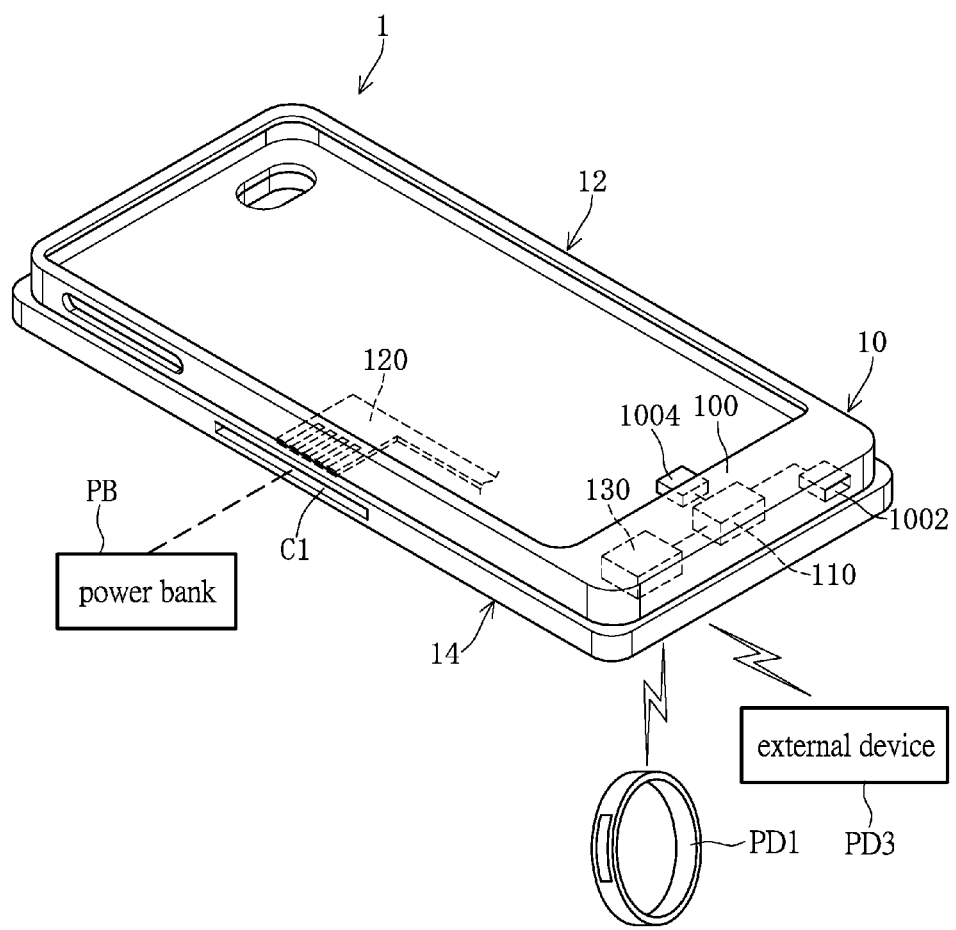
FIG. 3 is a schematic diagram of a protective case according to another exemplary embodiment of the instant disclosure.

FIG. 3 is a schematic diagram of a protective case according to another exemplary embodiment of the instant disclosure. As shown as FIG. 3, there is a protective case 1 adapted to accommodate a mobile communication device 9. Substantively, the protective case 1 of the present embodiment can be regarded as a mobile phone protective case. The mobile communication device 9 is a smart phone, a tablet computer or a personal digital assistant (PDA). For convenience of explanation, the mobile communication device 9 of the present disclosure uses a mobile phone to illustrate, but the present disclosure does not limit the mobile communication device 9.

The protective case 1 includes an accommodating portion 12, a bottom plate portion 14 and a smart ultra box 10. The accommodating portion 12 houses the mobile communication device 9. The bottom plate portion 14 couples with the accommodating portion 12. And the bottom plate portion 14 is disposed on an outside and bottom of the accommodating portion 12. As shown in FIG. 3, the smart ultra box 10 disposes on an outer side of the accommodating portion 12. The main body 100 of the smart ultra box 10 and the accommodating portion 12 is an integrated design. An output interface 1004 disposes on an inner side of the accommodating portion 12. An external power interface 1002 disposes on the outer side of the accommodating portion 12. For convenience of explanation, the smart ultra box 10 of the present embodiment disposes on a lateral side of the lower rim of the accommodating portion 12. However, in other embodiments, the smart ultra box 10 can be disposed on a lateral side of the upper rim of the accommodating portion 12, or the smart ultra box 10 can be disposed on a longitudinal side of the accommodating portion 12.

In addition, the protective case 1 is a plastic protective case or protective case made from other materials for protecting a smart phone. The accommodating portion 12 houses the smart phone. Wherein, the accommodating portion 12 configures a camera lens opening, a phone keypad opening, a charging opening, or other openings. Thus, all features and functions of the smart phone are completely usable through the openings of the accommodating portion 12. The above disclosure is not intended to limit the protective case 1 of the present invention. Furthermore, the protective case 1 provides features such as anti-dust, anti-scratch, anti-bump and waterproofing, etc. For example, the protective case 1 keeps dust and debris out of the main openings, like the openings and connecting ports of the smart phone. Thereby, the protective case 1 avoids dust accumulation or damage to the openings and connecting ports of the smart phone.

The flexible printed circuit board 120 can be disposed on the bottom plate portion 14. The bottom plate portion 14 is an outer casing of the protective case 1. The flexible printed circuit board 120 extends to a connecting portion C1 from the outer casing. That is, a terminal of the flexible printed circuit board 120 electrically connects to the connecting portion C1. Substantively, the connecting portion C1 electrically connects to a power bank PB. The connecting portion C1 is a connective port electrically corresponding with the power bank PB. The connecting portion C1 electrically connects to the power bank PB via engaging, mating, magnetic snapping or otherwise. The above disclosure is not intended to limit the connecting portion C1 of the present invention.

The flexible printed circuit board 120 electrically connects to the conversion unit 110. The flexible printed circuit board 120 extends outwardly from the main body 100. The external power interface 1002 receives a commercial power source. Then, the conversion unit 110 converts the commercial power source into a first electric power and a second electric power. The output interface 1004 outputs the first electric power, and the flexible printed circuit board 120 transmits the second electric power.

The smart ultra box 10 receives a 110 volt alternating current (AC) via the external power interface 1002. A power adapter 40 connects between the commercial power source and the external power interface 1002. Wherein, the power adapter 40 has a circuit design which is an alternating current (AC) to direct current (DC) converting circuit. Thereby, the power adapter 40 transmits a direct current power to the smart ultra box 10. Since the direct current power enters the ultra box 10 from the external power interface 1002, and the conversion unit 110 is a direct current (DC) to direct current (DC) converting circuit, the conversion unit 110 converts the direct current power into a first electric power in line with the electricity of the smart phone. Then, the output interface 1004 outputs the first electric power to the smart phone. Additionally, the conversion unit 110 converts the direct current power into a second electric power in line with the electricity of a power bank PB, and the flexible printed circuit board 120 transmits the second electric power to the power bank PB.

In another embodiment of the instant disclosure, when the power adapter 40 does not have a circuit design which can act as an alternating current (AC) to direct current (DC) converting circuit, the conversion unit 110 can serve as an alternating current (AC) to direct current (DC) converting circuit when an alternating current power enters the ultra box 10 from the external power interface 1002. The conversion unit 110 converts the alternating current power to a direct current power, and processes the direct current power using components such as rectifiers, regulators and transformers, etc. Thence, the conversion unit 110 outputs the first electric power via the output interface 1004, and transmits the second electric power via the flexible printed circuit board 120. The above disclosure is not intended to limit the smart ultra box 10 of the present invention.

Figure 4:
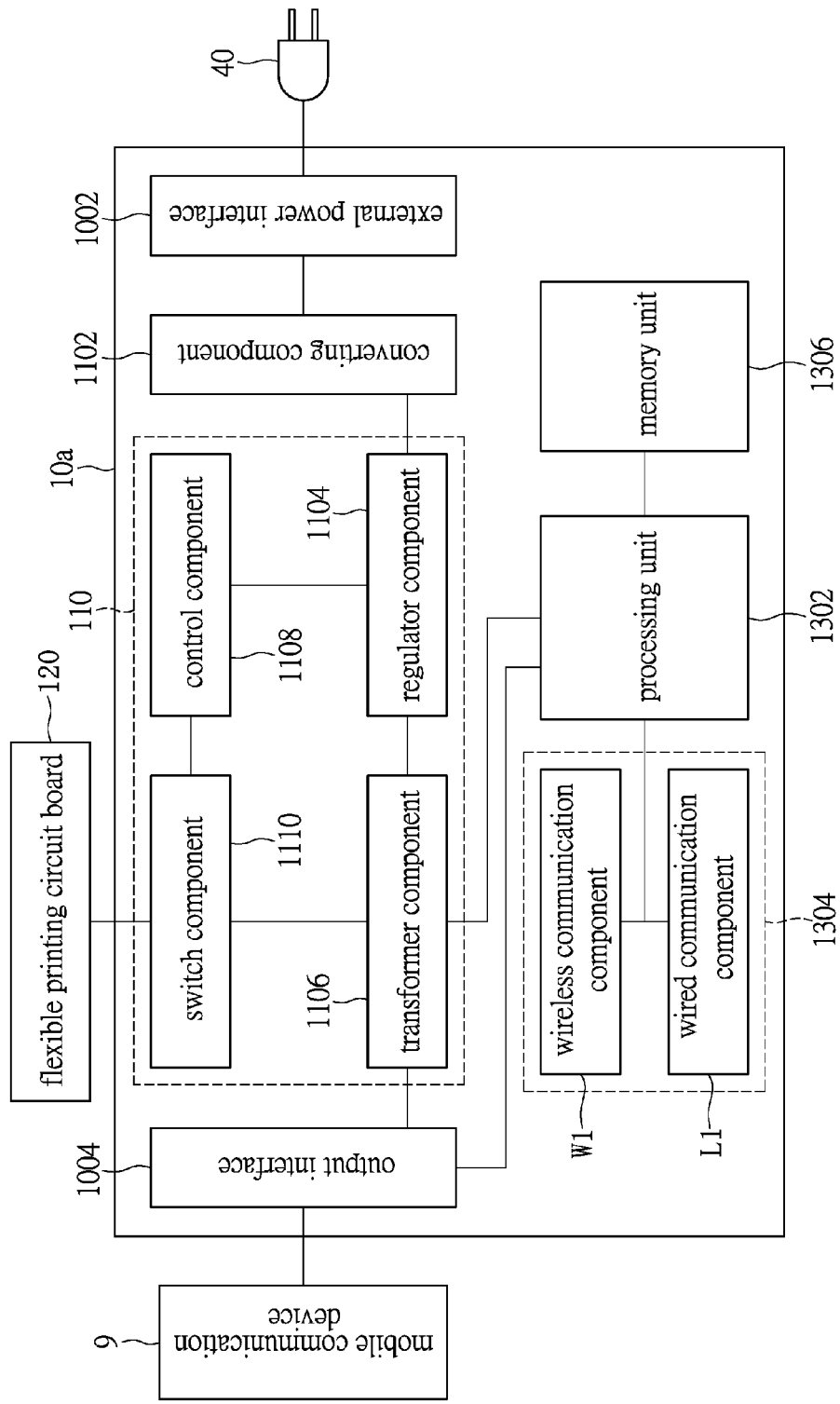
FIG. 4 is a functional block schematic diagram of a smart ultra box according to another exemplary embodiment of the instant disclosure.

Referring to FIG. 4, FIG. 4 shows a functional block schematic diagram of a smart ultra box according to another exemplary embodiment of the instant disclosure. The smart ultra box 10a of the present embodiment is similar as the smart ultra box 10 of the above-mentioned embodiment in FIG. 2. However, there are still existing differences between the smart ultra box 10a and the smart ultra box 10. The smart ultra box 10a further includes a flexible printed circuit board 120. The flexible printed circuit board 120 electrically connects to a switch component 1110 of the conversion unit 110, and the flexible printed circuit board 120 extends outwardly and outputs power. Except for the above differences, relevant details of the operations for the smart ultra box and protective case thereof are described in the embodiments of FIGS. 1-3, and thus are not repeated.

Additionally, in the present embodiment, a conversion unit 110 includes a converting component 1102, a regulator component 1104, a transformer component 1106, a control component 1108 and a switch component 1110 which is electrically connected to the control component 1108. Substantively, the converting component 1102 is electrically connected to the external power interface 1002 and the regulator component 1104. The transformer component 1106 is electrically connected to the output interface 1004 and the flexible printed circuit board 120. The switch component 1110 is electrically connected between the transformer component 1106 and the flexible printed circuit board 120. The control component 1108 is electrically connected to the regulator component 1104 or the transformer component 1106, and the control component 1108 is for controlling the switch component 1110 switching on/off.

The control component 1108 implements through circuits of semiconductor electronic components, such as a control circuit, a processing circuit or an analyzing circuit. The above disclosure is not intended to limit the control component 1108 of the present invention. Wherein, a working power of the control component 1108 comes from the regulator component 1104. However, in other embodiments, the working power of the control component 1108 comes from the transformer component 1106. A person of ordinary skill in the art could design the control component 1108 freely.

Additionally, in the present embodiment, the smart ultra box 10 further includes a power adapter 40. The power adapter 40 connects between the commercial power source and the external power interface 1002. The power adapter 40 has an alternating current (AC) to direct current (DC) converting circuit. The converting component 1102 is a direct current (DC) to direct current (DC) converting circuit which is implemented through a boost circuit, a buck circuit, buck-boost circuit and/or a combination of one or more thereof. The regulator component 1104 is a voltage regulator circuit or a filter circuit. The transformer component 1106 is a voltage transformer circuit. In other embodiments, the converting component 1102 is an alternating current (AC) to direct current (DC) converting circuit, and converts an alternating current power to a direct current power. The above disclosure is not intended to limit the converting component 1102, the regulator component 1104 and the transformer component 1106 of the present invention.

The conversion unit 110 further includes a protective component which is implemented through an over-charge protective circuit, an over-current protective circuit, an over-voltage protective circuit and/or a combination of one or more thereof. The above disclosure is not intended to limit the protective component of the present invention.

When the protective case 1 has been electrically connected to an external power source such as a commercial power source, the external power source enters the conversion unit 110 via the power adapter 40 and the external power interface 1002. Wherein, the conversion unit 110 converts the alternating current power to a direct current power. After the regulator component 1104 regulates the direct current power, the direct current power is transmitted to the transformer component 1106. Then, the direct current power outputs to a smart phone via the output interface 1004. In addition, the direct current power outputs to a power bank PB via the connecting portion C1.

In the present embodiment, the commercial power source can charge a smart phone and a power bank PB. After the power bank PB is fully charged, the control component 1108 switches the switch component 1110 to an off state. Thereby, the external power source stops charging the power bank PB. In addition, there is a switch component configured between the transformer component 1106 and the output interface 1004. Thus, the control component 1108 can control a supply circuit, between the transformer component 1106 and a mobile communication device 9, switching it on/off.

The processing unit 1302 and the control component 1108 can be two similar circuits, such as control circuits, processing circuits or analyzing circuits in the present embodiment. However, there are still existing differences such as features and applications between the processing unit 1302 and the control component 1108. In another embodiment, the processing unit 1302 and the control component 1108 is integrated with a control circuit, a processing circuit or an analyzing circuit, so that the integrated circuit processes signals between each unit and controls the switch component 1110 switching it on/off. The above disclosure is not intended to limit the processing unit 1302 and the control component 1108 of the present invention.

Figure 5:
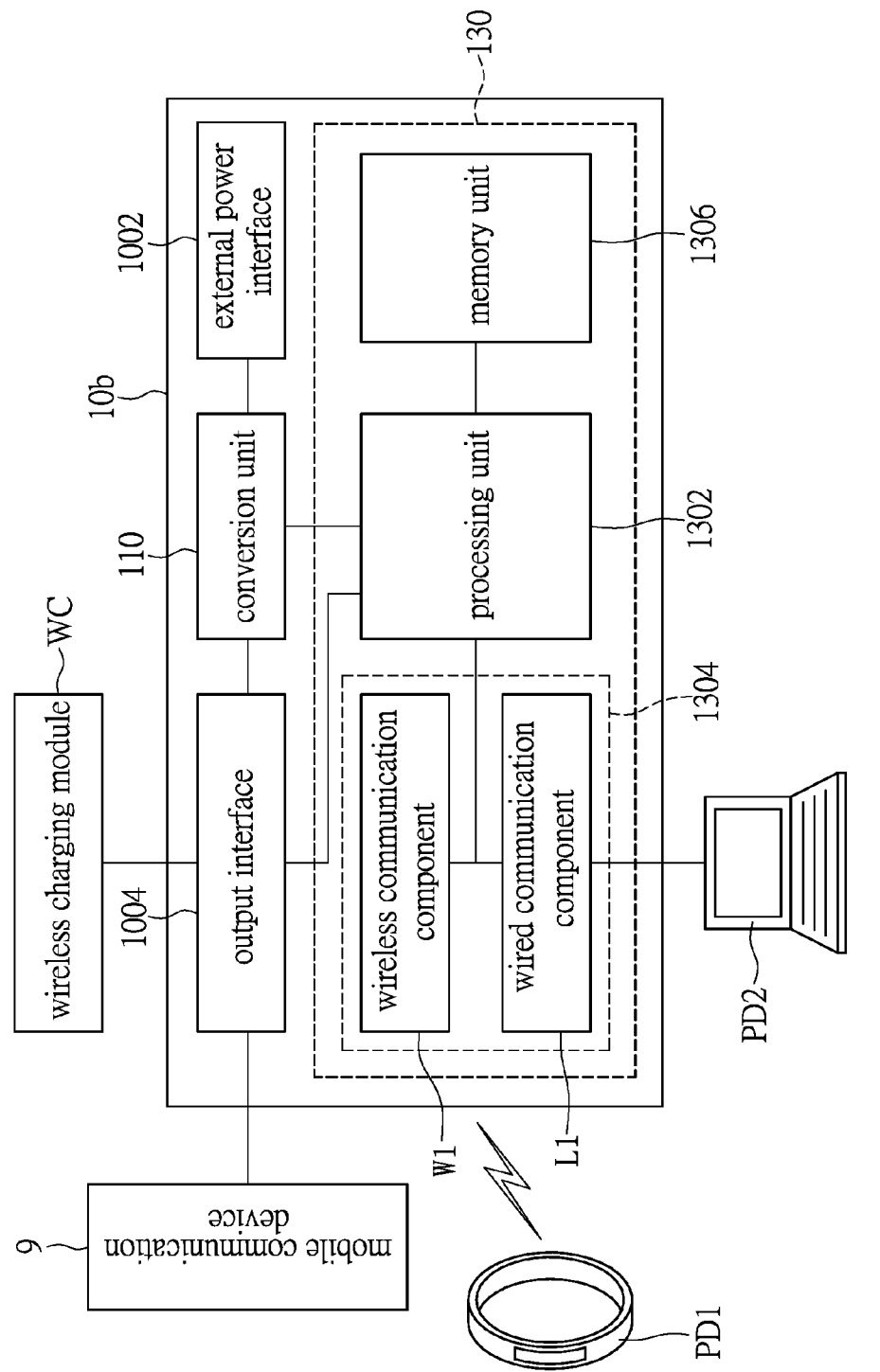
FIG. 5 is a functional block schematic diagram of a smart ultra box according to another exemplary embodiment of the instant disclosure.

Referring to FIG. 5, FIG. 5 shows a functional block schematic diagram of a smart ultra box according to another exemplary embodiment of the instant disclosure. The smart ultra box 10b of the present embodiment is similar to the smart ultra box 10 of the above-mentioned embodiment. However, there are differences between the smart ultra box 10b and the smart ultra box 10. That is, a smart ultra box 10b further includes a wireless charging module WC. The wireless charging module WC disposes on the protective case such as the bottom plate portion 14 or the accommodating portion 12. The above disclosure is not intended to limit a configuration location of the wireless charging module WC.

The wireless charging module WC is for charging and discharging the battery of the conversion unit 110 or smart phone through wireless charging technology. The wireless charging module WC electrically connects to the output interface 1004 which is coupled to a smart phone. Also the wireless charging module WC electrically connects to the battery of the conversion unit 110.

The wireless charging module WC includes an induction coil, a magnetic energy converter, a transmission controller, a receiving controller and an electrical energy converter. The induction coil is coupled to the magnetic energy converter, the transmission controller, the receiving controller and the electrical energy converter. The magnetic energy converter is coupled to the transmission controller. The receiving controller is coupled to the electrical energy converter. The magnetic energy converter and the transmission controller are used for discharging, and the receiving controller and the electrical energy converter are used for charging.

The wireless charging module WC is disposed on the wireless charger to charge the battery of the conversion unit 110. If the battery of the conversion unit 110 reaches saturation, the wireless charging module WC can keep the battery of the conversion unit 110 from discharging via the magnetic energy converter and the transmission controller. The wireless charging module WC can charge the smart phone with wireless charging function in the meantime. In addition, in another embodiment, the smart phone does not have wireless charging function. Therefore, the wireless charging module WC connects to the output interface 1004, and transmits the power from the battery of the conversion unit 110 to the smart phone via the output interface 1004. Except for the above differences, relevant details of the operations for the smart ultra box and its protective case are described in the embodiments of FIGS. 1-4, and thus are not repeated.

To sum up, the instant disclosure provides a smart ultra box and its protective case for communication with an external device through an expansion module, wherein, the expansion module includes a communication unit for communication with the wearable device or intelligent appliance via wireless or wired. Additionally, the information recorded by the wearable device or intelligent appliance transmits and stores to the memory unit of the expansion module, or the above information directly transmits to the mobile communication device. The memory unit is such as an extended memory of the mobile communication device. Thus, the memory unit increases extra memory capacitance of the mobile communication device. The expansion module is for supplying power to a mobile communication device through power converter designed, or transmitting power from a flexible printed circuit board. Wherein, the conversion unit outputs a first electric power and a second electric power via a direct current (DC) to direct current (DC) converting circuit or an alternating current (AC) to direct current (DC) converting circuit. The first electric power is transmitted by the output interface. The second electric power is transmitted by the flexible printed circuit board. When a user uses a protective case of the present disclosure, the smart phone housing in the protective case can be charged directly through an external power supply. As a result, the present disclosure really enhances the ease of operation, efficiency and quality of the smart ultra box and its protective case.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A smart ultra box, adapted to a protective case protecting a mobile communication device, the ultra box comprising:
    a main body, having an output interface and an external power interface;
    a conversion unit, disposed on the main body, to electrically connect the output interface and the external power interface; and
    an expansion module, electrically connected to the conversion unit;
    a flexible printed circuit board, electrically connected to the conversion unit, the flexible printed circuit board extending outwardly from the main body;
    wherein, the expansion module is for communication with an external device; the expansion module comprises a processing unit, a memory unit and a communication unit; the processing unit is electrically connected to the conversion unit, the output interface, the memory unit and the communication unit; the conversion unit is for supplying power to the processing unit, the communication unit and the memory unit; the communication unit is for communication with the external device; the processing unit processes signals between each of the units and transmits the signals of the external device to the mobile communication device;
    wherein, the external power interface receives a commercial power source, the conversion unit converts the commercial power source into a first electric power and a second electric power.

2. The smart ultra box according to claim 1, wherein the memory unit is a secure digital memory card (SD Card), a flash memory and/or a combination of one or more thereof, and the communication unit is a wireless communication component, a wired communication component and/or a combination of one or more thereof.

3. The smart ultra box according to claim 1, wherein the output interface outputs the first electric power to the mobile communication device, and the flexible printed circuit board transmits the second electric power to a power bank.

4. The smart ultra box according to claim 3, wherein the conversion unit comprises a converting component, a regulator component and a transformer component, said converting component is electrically connected to the external power interface and said regulator component, and said transformer component is electrically connected to the output interface and the flexible printed circuit board.

5. The smart ultra box according to claim 4, wherein the conversion unit further comprises a control component and a switch component which is electrically connected to the control component, the switch component is electrically connected between the transformer component and the flexible printed circuit board, the control component is electrically connected to the regulator component or the transformer component, and the control component is for controlling the switch component switching on/off.

6. The smart ultra box according to claim 1, further comprising a wireless charging module, disposed on the protective case, the wireless charging module electrically connected to the output interface, for supplying power to the mobile communication device.

7. The smart ultra box according to claim 1, wherein the conversion unit further comprises a battery, to store and supply electricity to the expansion module.

8. A protective case, adapted to accommodate a mobile communication device, the protective case comprising:
    an accommodating portion, to house the mobile communication device; and
    a smart ultra box as claimed in claim 1 in which the ultra box disposes on an outer side of the accommodating portion.

9. The protective case according to claim 8, further comprising a bottom plate portion, coupling with the accommodating portion, wherein the bottom plate portion is an outer casing of the protective case, the flexible printed circuit board extends to a connecting portion from the outer casing, and a terminal of the flexible printed circuit board electrically connects to the connecting portion, the connecting portion electrically connects to a mobile power supply device.

10. The protective case according to claim 8, wherein the main body of the ultra box and the accommodating portion is an integrated design, the output interface disposes on an inside of the accommodating portion, and the external power interface disposes on the outer side of the accommodating portion.

11. The protective case according to claim 8, further comprising a wireless charging module, disposed on the protective case, the wireless charging module electrically connected to the output interface, for supplying power to the mobile communication device.

* * * * *